United States Patent
Carlsson

(10) Patent No.: US 12,458,776 B2
(45) Date of Patent: Nov. 4, 2025

(54) CATHETERS WITH BEVELLED DRAINAGE HOLES

(71) Applicant: DENTSPLY IH AB, Mölndal (SE)

(72) Inventor: Christian Carlsson, Floda (SE)

(73) Assignee: Dentsply IH AB, Molndal (SE)

( * ) Notice: Subject to any disclaimer, the term of this patent is extended or adjusted under 35 U.S.C. 154(b) by 1382 days.

(21) Appl. No.: 16/336,072

(22) PCT Filed: Dec. 21, 2016

(86) PCT No.: PCT/EP2016/082059
§ 371 (c)(1),
(2) Date: Mar. 22, 2019

(87) PCT Pub. No.: WO2017/108879
PCT Pub. Date: Jun. 29, 2017

(65) Prior Publication Data
US 2020/0269011 A1     Aug. 27, 2020

(30) Foreign Application Priority Data
Dec. 21, 2015  (EP) .................................... 15201646

(51) Int. Cl.
*A61M 25/00*  (2006.01)
*B26D 7/18*   (2006.01)

(52) U.S. Cl.
CPC ...... *A61M 25/0015* (2013.01); *A61M 25/007* (2013.01); *B26D 7/1836* (2013.01); *A61M 2210/1089* (2013.01)

(58) Field of Classification Search
CPC ............ A61M 25/0015; A61M 25/007; A61M 2210/1089; A61M 2207/10;
(Continued)

(56) References Cited

U.S. PATENT DOCUMENTS 4,259,276 A     3/1981 Rawlings
4,554,849 A  *  11/1985 Benham .................... B26F 1/02
                                                    83/40

(Continued)

FOREIGN PATENT DOCUMENTS

CN      101854883 B  *  7/2013  ......... A61B 17/0401
EP      0799069          5/2003
(Continued)

OTHER PUBLICATIONS

Extended European Search Report for European Patent Application No. 15201646.5, mailed Jul. 15, 2016 (8 pages).
(Continued)

*Primary Examiner* — Rebecca E Eisenberg
*Assistant Examiner* — Kate Elizabeth Strachan
(74) *Attorney, Agent, or Firm* — SCHWEGMAN LUNDBERG & WOESSNER, P.A.

(57) ABSTRACT

A method and a device for forming holes (17a, 17b) through a lateral wall of a catheter are disclosed. The method comprises the steps of providing a section of the catheter between a pair of tubular punching members 6, driving at least one of said pair of tubular punching members towards the other in order to punch through said lateral wall 23 of the catheter and thereby sever one pair of oppositely located hole pieces from the lateral wall, actuating an ejection unit 7, in order to force said severed hole pieces away from the catheter via said internal lumen of the tubular punching members, withdrawing said pair of tubular punching members. A catheter 2 produced is also disclosed.

9 Claims, 5 Drawing Sheets

(58) Field of Classification Search
CPC .......... A61M 2210/1096; A61M 27/00; A61M 25/0017; B26D 7/1836; B26D 7/1854; B26F 1/0015; B29C 69/001; B29C 2793/00; B29C 2793/0045; B29C 2793/009
See application file for complete search history.

(56) References Cited

U.S. PATENT DOCUMENTS

| | | | | |
|---|---|---|---|---|
| 5,643,230 | A * | 7/1997 | Linder | A61M 25/008 604/264 |
| 2002/0046633 | A1 | 4/2002 | Borowczak et al. | |
| 2004/0149115 | A1 * | 8/2004 | Ide | G11B 7/26 83/100 |
| 2004/0193143 | A1 | 9/2004 | Sauer | |
| 2006/0027063 | A1 | 2/2006 | Currier et al. | |
| 2006/0253104 | A1 * | 11/2006 | Pandey | A61M 25/0017 604/540 |
| 2013/0006225 | A1 * | 1/2013 | Cucin | A61B 10/0283 604/542 |

FOREIGN PATENT DOCUMENTS

| | | | | |
|---|---|---|---|---|
| EP | 2745868 | | 6/2014 | |
| EP | 2745868 A1 * | | 6/2014 | ........... A61L 29/085 |
| EP | 3184140 | | 6/2017 | |
| JP | H0221380 B2 | | 5/1991 | |
| JP | 2003505252 A | | 2/2003 | |
| JP | 2004-42207 | | 2/2004 | |
| JP | 2010530266 A | | 9/2010 | |
| JP | 2014523351 A | | 9/2014 | |
| WO | WO-2007008992 A2 * | | 1/2007 | .......... B41F 15/0836 |
| WO | 2008155145 | | 12/2008 | |
| WO | WO-2008155145 A1 * | | 12/2008 | .......... A61M 25/001 |
| WO | 2010149175 | | 12/2010 | |
| WO | 2011036162 | | 3/2011 | |
| WO | 2017108879 | | 6/2017 | |

OTHER PUBLICATIONS

International Search Report and Written Opinion for International Patent Application No. PCT/EP2016/082059, mailed Mar. 13, 2017 (11 pages).

Office Action mailed Oct. 13, 2020 for Japanese Patent Application No. 2018-531321 (16 pages).

Office Action dated Oct. 22, 2023 for Korean Patent Application No. 10-2018-7020229.

"European Application Serial No. 15201646.5, Response filed Dec. 19, 2017 to Extended European Search Report mailed Jul. 15, 2016", 16 pgs.

"International Application Serial No. PCT EP2016 082059, International Preliminary Report on Patentability mailed Jul. 5, 2018", 8 pgs.

* cited by examiner

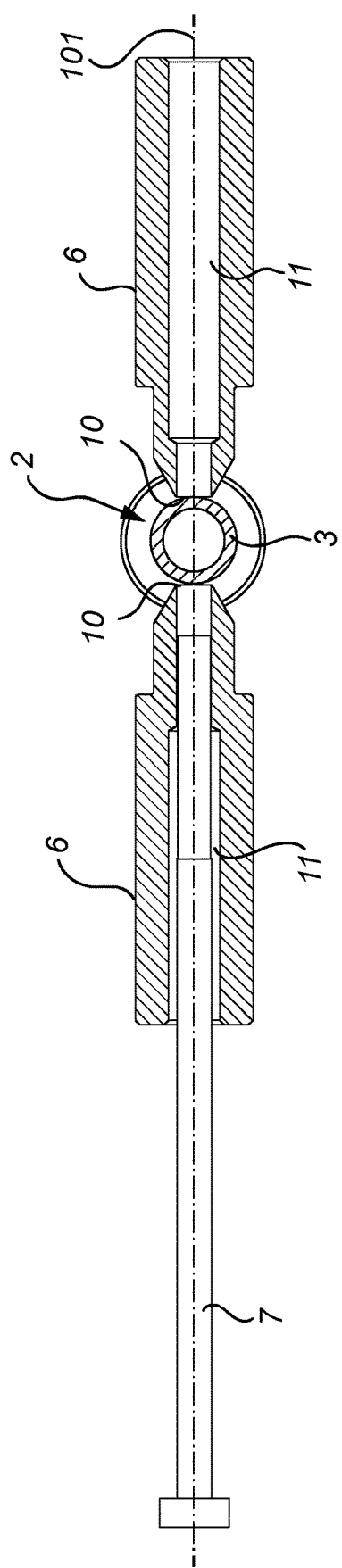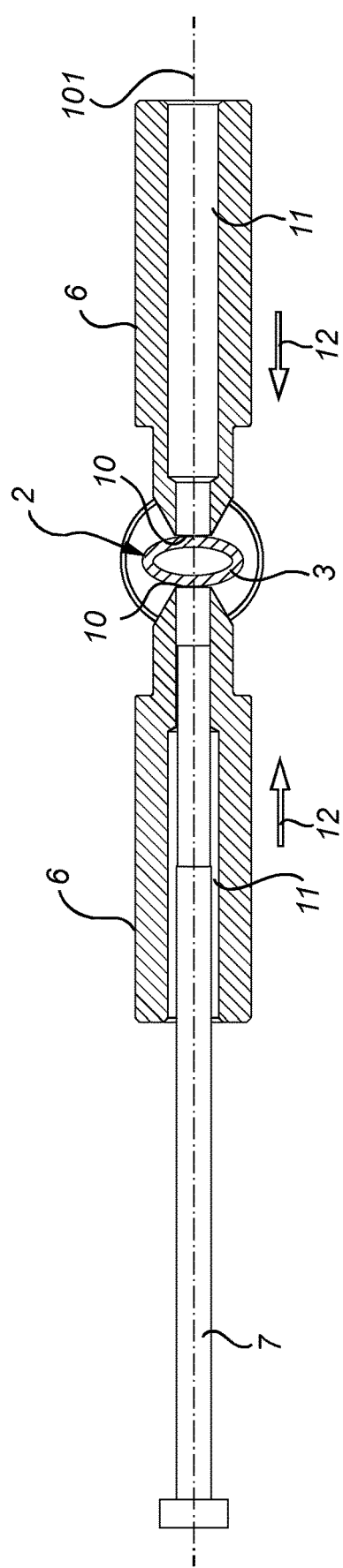

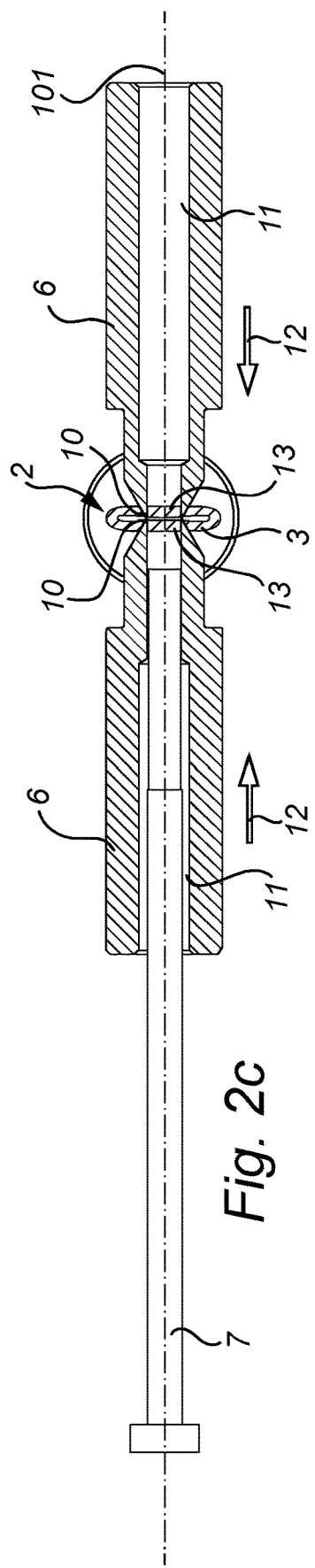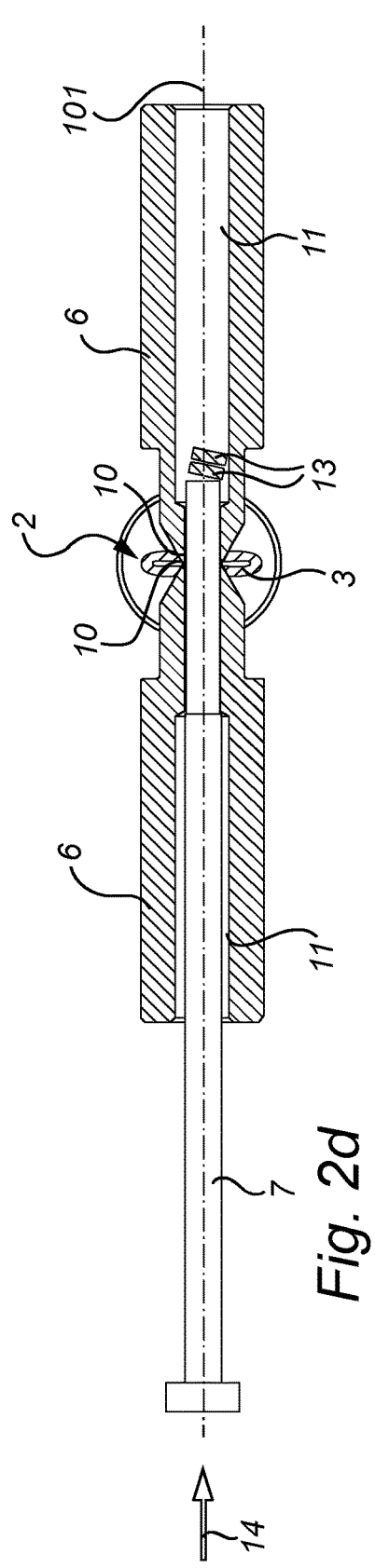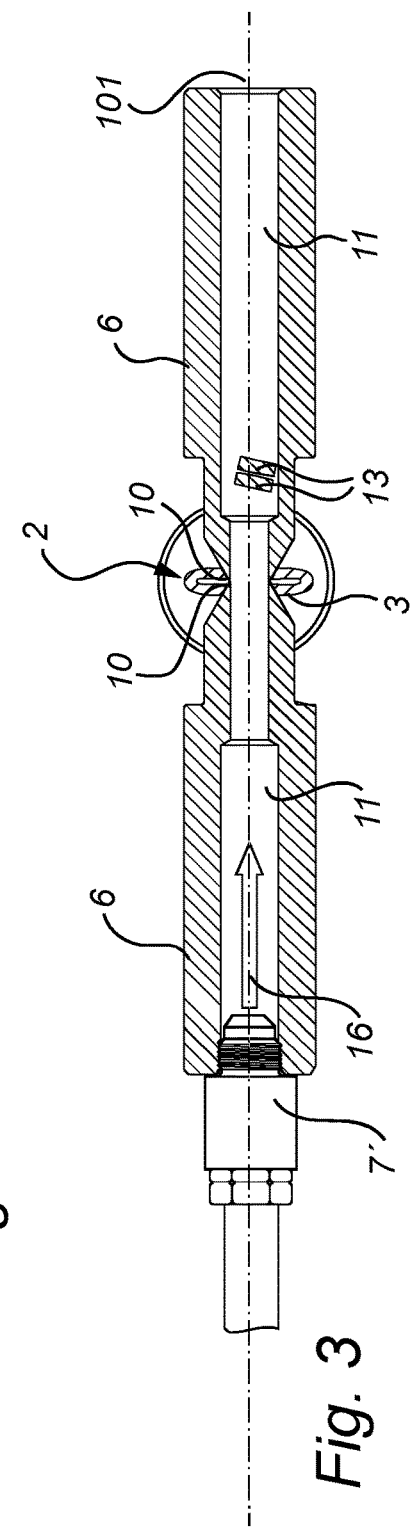
Fig. 2c
Fig. 2d
Fig. 3

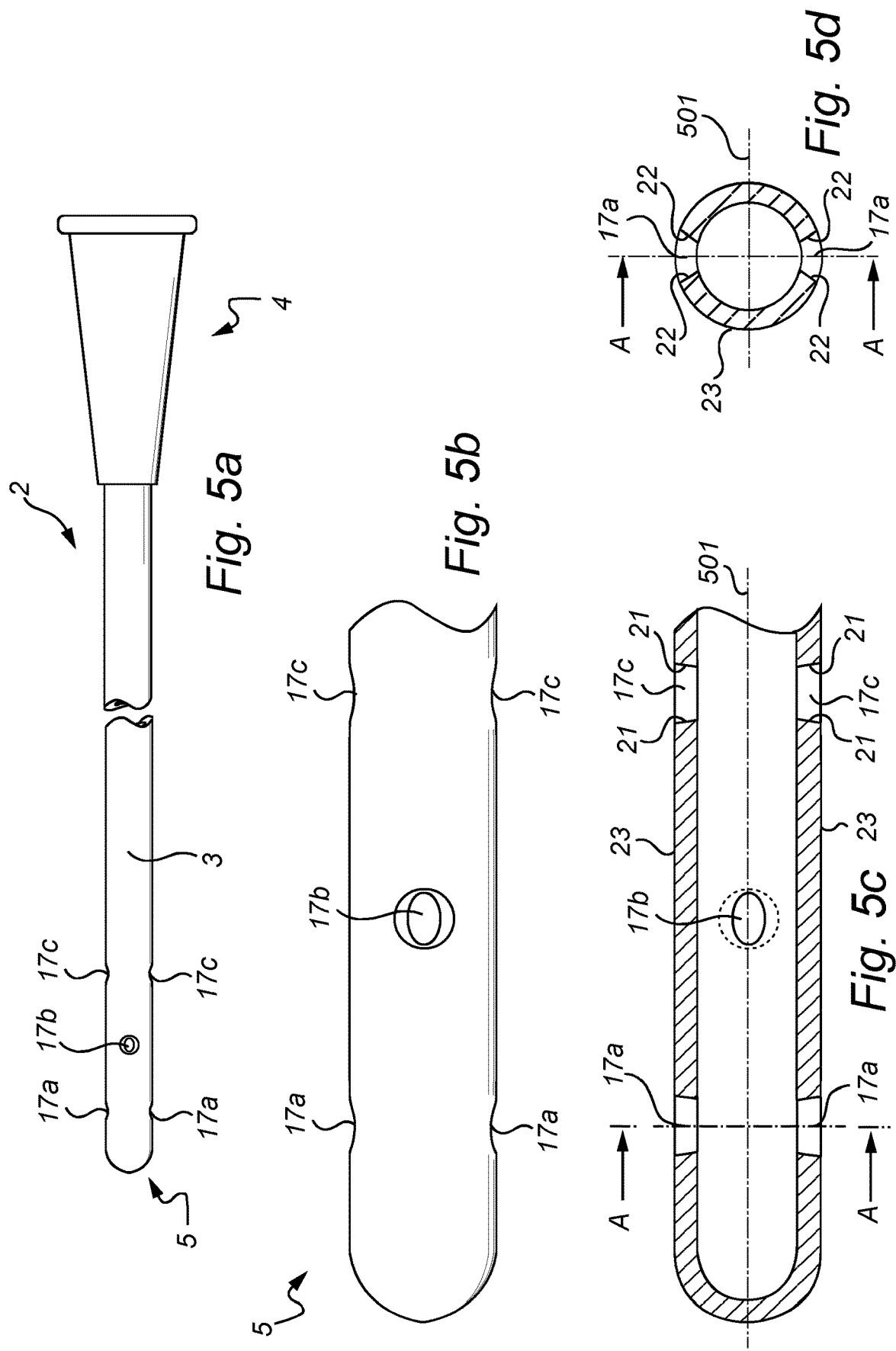

CATHETERS WITH BEVELLED DRAINAGE HOLES

CROSS REFERENCE TO RELATED APPLICATIONS

This patent document is a 371 National Phase Application of International Patent Application No. PCT/EP2016/082059, filed Dec. 21, 2016, which claims priority to European Patent Application No. 15201646.5, filed Dec. 21, 2015. The entire contents of the aforementioned patent applications are incorporated by reference as part of the disclosure of this patent document.

TECHNICAL FIELD OF THE INVENTION

The present invention relates to catheters, such as urinary catheters, and more specifically to catheters having beveled drainage holes. The invention also relates to a method and device for forming such holes in a catheter.

BACKGROUND

Catheters are medical devices used for many various medical treatments, and are generally thin (hollow) tubes with a perforated tip or ending, otherwise called insertion end or insertable end. By different manufacturing processes and material choices, catheters can be tailored to serve a broad range of functions in the medical field, e.g. for cardiovascular, gastrointestinal, neurovascular and urological applications, and so forth.

Urinary catheters are commonly used for draining urine from the bladder, or less frequently for administration of fluids into the bladder. Patients can be recommended to use a urinary catheter for various reasons, such as e.g. urinary incontinence, urinary retention, surgery on the prostate or genitals, or other medical conditions, such as e.g. multiple sclerosis, spinal cord injury, dementia, etc.

Generally, the procedure of urinary catheterization, i.e. emptying the human bladder by inserting a urinary catheter into the urethra, can be summarized as follows. Firstly, upon insertion of the catheter, the catheter tip and a section of the catheter shaft reaches the human bladder, and urine starts to flow via a set of drainage openings or holes at or near the tip (insertion end), through the lumen of the catheter shaft/body into a funnel shaped catheter outlet (i.e. a so-called connector). The urine then leaves the catheter and flows into a toilette or a urinary bag for collection of urine.

For example, catheterization is often required for a patient having problems with urinary retention, i.e. where the bladder is unable to evacuate urine, which can be either due to the sphincter muscle being too tight or the bladder muscles are too lax rendering a patient to be unable to completely empty the bladder during urination. One type of urinary catheters used in these cases is indwelling catheters, so-called Foley catheters, which are maintained in the urethra for an extended period of time, such as for days, weeks or even months. Another type of urinary catheters is intended for short term use, so-called intermittent catheters. Intermittent urinary catheters are used for draining the bladder once, and then removed. Moreover, intermittent catheters are typically used for a few minutes, and the catheterization is typically made by the user him/her self, so-called self-catheterization, oftentimes according to a predetermined time schedule, such as e.g. every three to four hours.

However, a common feature for all types of urinary catheters, and also many other types of catheters, is the presence of drainage openings/holes (sometimes called catheter eyes) at the insertable front end, i.e. the tip. Most drainage openings are oval in shape and may be formed in various ways, such as e.g. by injection molding, by punching and the like.

An example of a method for manufacturing catheters and in particular for forming the drainage openings (drainage eyes) is e.g. disclosed in WO 2010/149175 in the form of injection molding manufacturing, where the drainage openings can be provided during the injection molding of the catheter tube. However, these types of manufacturing methods often result in sharp and uneven edges, which increase the need for costly post-processing steps to make the edges smoother and rounded.

Another example of a manufacturing method for drainage openings in catheters is disclosed in US 2004/0193143, where the openings (orifices) are formed e.g. by a conventional punching operation. However, even if this solution is generally more cost-efficient it is still prone to the same type of drawback as previously discussed, i.e. sharp outer edges requiring costly post-processing, here in the form of temperature treatment.

General problems associated with providing drainage openings are accordingly, that it is relatively costly, and that there is also a substantial risk that severed parts remain in the catheters, leading to malfunction and possibly also health hazards. Furthermore, it is often very difficult to provide drainage openings with smooth edges without expensive and inefficient additional processing steps, i.e. making openings without sharp and/or uneven edges (forming burrs around the opening). Such sharp and/or uneven edges may cause great discomfort for a patient being subdued to catheterization, and may also injure the urethra.

A further problem with most known catheter opening solutions is that the catheter shaft becomes very weak in the vicinity of the openings, which may lead to kinking of the shaft during use.

There is therefore a need for a catheter having improved drainage openings, as well as a method and device for forming holes in a catheter which alleviates these drawbacks, and specifically minimizes the risk of severed material remaining in the catheters, increases patient comfort, reduces the risk for harm and injury caused by the catheterization, and/or reduces the need for costly post-processing steps (e.g. vision control systems), thereby providing a more cost-efficient catheter and production.

SUMMARY

It is therefore a general object of the present invention to alleviate the above-discussed problems.

This object is achieved by means of a method, a device and a catheter in accordance with the present invention, as defined in the appended claims.

According to a first aspect of the invention there is provided a method for forming holes through a lateral wall of a catheter, said method comprising the steps of:
  providing a section of the catheter between a pair of tubular punching members each having an internal lumen;
  driving at least one tubular punching member of said pair of tubular punching members towards the other in order to punch through said lateral wall of the catheter and thereby sever one pair of oppositely located hole pieces from the lateral wall;

actuating an ejection unit, in order to force said severed hole pieces away from the catheter via one of said internal lumens of the tubular punching members;

withdrawing said pair of tubular punching members.

Hereby a simple and cost-efficient method for forming drainage openings or holes in a catheter is provided with a greatly reduced risk of residual material being left inside the catheter after a punching operation.

The term "tubular" as used herein refers to an object generally having the form or shape of a tube, where "tube" here refers to an elongated shaft with a lumen therein, such as e.g. an elongate hollow cylinder, having a circular cross-section, but may also be a hollow shaft of other cross-sectional shapes e.g. oval, polygonal, etc. Further, lumen is to be understood as the central cavity of a tubular structure or any other hollow structure.

The term lateral wall is to be interpreted as the side walls of the catheters, and in particular the wall of the catheter shaft. The lateral wall forms the material of a certain thickness encircling the inner lumen of the catheter.

The present invention is, as mentioned, particularly suitable for forming drainage openings, so called catheter-eyes, in the insertable tip portion (insertion end) of a catheter, such as, e.g. a urinary catheter. The method can be said to involve the steps of forming or punching a pair of oppositely located holes in a lateral wall of a catheter by having a pair of tubular punching members engaging the catheter from opposite sides. Where oppositely located is in reference to a cross-sectional plane comprising a longitudinal central axis of the catheter. The tubular punching members are preferably driven towards each other, through the lateral wall/tubing material, and preferably almost brought in contact with each other within the catheter lumen, leaving only a small distance, e.g. a few micrometers, between each other. The tubular punching members may alternatively be driven so to come in contact with each other within the catheter lumen. The severed material remains within the internal lumen of one or both of the two tubular punching members until the severed material is forced away from the catheter via the internal lumen of the tubular punching members, which in practical implementations has completely alleviated the problem of residual material being left in the catheter lumen after the manufacturing of drainage openings.

It has surprisingly been found by the present inventor that punching holes from two sides significantly reduces the risk of residual/severed material being left inside the catheter lumen, and that the provision of ejector means for expelling the severed parts internally within the punching members mitigates this risk even further. As a consequence, the potential health hazards associated with foreign substances in the form of residual/severed material entering a patient's internal system are reduced. Moreover, the method reduces costs associated with catheter manufacturing/production since the need to perform checks for residual material is minimized. Thus, the need for expensive production steps such as automated vision control systems or manual inspection processes is diminished. Additionally the number of cassation catheters due to residual material being left inside the catheter lumen is reduced which renders the production of catheters even more cost-efficient.

Furthermore the inventor realized that (simultaneously) punching holes from two opposing sides also allows for forming holes of smaller dimensions, i.e. smaller diameters. Smaller drainage holes are advantageous in terms of that the decreased size of the holes also results in that the risk for kinking is also decreased. Further, it has been surprisingly been found that this novel way of forming drainage holes provides very smooth, beveled edges, without any need for post-formation procedures (see further discussion below). Less risk of kink and smoother edges result in less risk for injuries and discomfort for patients. Further, experimental data shows that smaller holes do not have any negative effect on the drainage properties of the catheter, instead it is the total "hole area" that is of importance. Thus, it can be said that a larger amount of smaller holes are preferred over a smaller amount of large holes (provided that the combined area of the smaller holes is larger or equal to that of the large holes).

Moreover there are further practical advantages with smaller drainage openings in terms of user-friendliness. During catheterization there is often, initially, a high risk of high flow rates when the drainage opening(s) are introduced into the bladder, in particular, for catheters having the conventional larger catheter eyes, the pressure inside the bladder may be so high that the urine shoots out of the drainage end (back end) of the catheter before the user (sometimes a nurse) has time to attach a bag or the like. Especially less experienced users encounter difficulties with this sudden burst during catheterization, however, by having a number of smaller holes the initial flow rate is significantly easier to control, since the flow will increase gradually as the catheter tip is inserted into the urethra.

Continuingly, the invention is robust in terms of higher tolerances on the condition of the cutting edge of the tubular punching members. Therefore, the manufacturing components (tubular punching members) require less maintenance and/or need to be replaced less often which further reduces production costs. Moreover, since the cutting edge of the tubular punching members can be blunter than in conventional punching devices where the drainage openings are not punched from two directly opposing sides of a catheter section, the resulting edges of the drainage openings are also softer. An additional benefit of having blunter cutting edges is that the cutting edges can be hardened (or cured) to a much higher degree since the risk of cracks due to a too thin layer of material being cured is reduced.

According to one exemplary embodiment the step of actuating an ejection unit comprises:

driving an ejector tool at least partly through the internal lumen in a longitudinal direction of one tubular punching members and subsequently at least partly through the internal lumen the other tubular punching member; and withdrawing said ejector tool. The withdrawal of the ejector tool can be performed either before, during or after the withdrawal of the tubular punching members, depending on the intended application or specific situation. This embodiment allows for a simple and cost-efficient mechanical means for ensuring the removal of the residual/severed material which is residing in the tubular punching members' internal lumen after the punching operation. In more detail the ejector tool can be an elongated cylindrical body which is moved in the lumen of the tubular punching members. The ejector tool is accordingly moved through one of the tubular punching members at least partly along its central axis, and then into the other tubular member, thereby pushing/forcing the residual material (severed hole pieces, punched out material) through either one or both of the internal lumens of the tubular punching members and consequently away from catheter.

According to another exemplary embodiment the step of actuating an ejection unit comprises:

blowing compressed air through the internal lumen of said pair of tubular punching members. This allows for a simple alternative way to remove residual/severed material from the pair of tubular punching members, and consequently from the catheter lumen. By blowing compressed air from a proximal/back end of one tubular punching members and through its lumen towards the other tubular punching member the severed material residing inside their internal lumen after a punching operation can efficiently be removed. Further, since less movable parts are present the complexity of the manufacturing process may be reduced.

According to another aspect of the invention there is provided a device for forming holes through a lateral wall of a catheter, where the device comprises:
  a pair of tubular punching members, wherein each tubular punching member has a cutting edge and an internal lumen, wherein at least one tubular punching member of said pair of tubular punching members is movable towards the other in order to punch through said lateral wall of the catheter and thereby sever one pair of oppositely located hole pieces from said lateral wall; and
  an ejection unit configured to force said severed hole pieces away from the catheter via said internal lumen of the tubular punching members.

With this aspect of the invention, similar advantages and preferred features are present as in the previously discussed first aspect of the invention, and vice versa. The cutting edge preferably has a diameter between 1.0 mm and 2.5 mm, however other diameters are possible.

In one exemplary embodiment, the device further comprises at least one additional pair of tubular punching members, wherein each pair of tubular punching members is arranged to punch through said lateral wall at different positions along a longitudinal axis of said catheter; and
    one ejection unit for each pair of tubular punching members.

This further increases the efficiency of the device by enabling simultaneous punching of two, three, four or even more pairs of drainage openings. The punching members can also be arranged at different angular positions within the device, e.g. arranged in an alternating manner with a 90 degree separation around a longitudinal axis of the catheter. The device for forming holes may also be operated more than once, such as two, three or more times on the same catheter, preferably after having changed the position of the catheter in length and/or rotational position between the repetitions.

According to one exemplary embodiment the ejection unit is an ejector tool arranged to be movable at least partly through the internal lumen of one tubular punching member of each pair of tubular punching members and subsequently at least partly through the internal lumen of the other tubular punching member of said pair of tubular punching members.

The ejector tool may have a cylindrical shape and comprise a front end having a top surface, and wherein said top surface is substantially planar. Preferably the ejector tool has a shape in accordance with the tubular punching members, i.e. if the tubular punching members have a circular cross-section the ejector tool should have a circular cross-section, in order to efficiently move within the internal lumen of the tubular punching members. The planar (or flat) top end also optimizes the pushing of residual material as the risk of material being caught between the inner lateral surface and the ejector tool is reduced.

Moreover, in another exemplary embodiment, each tubular punching member may have portions along its longitudinal axis with different internal radii, e.g. a front portion (a portion closest to the cutting edge) may have a smaller internal radius in comparison to a back portion. Accordingly, the ejector tool preferably has a radius which is slightly smaller than the smallest internal radius of the tubular punching member. Slightly smaller radius should in the present context be interpreted as about 90-99% of a reference radius.

In yet another exemplary embodiment the ejection unit is a nozzle of an air compressor, wherein said nozzle is arranged to blow compressed air through the internal lumen of each pair of tubular punching members. Accordingly, in embodiments where the device has a plurality of pairs of tubular punching members, each pair may have a separate nozzle arranged to blow compressed air through their internal lumen. Moreover, all of the nozzles may be connected to the same air compressor or be associated with separate air compressors depending on the intended application.

The mechanical ejection, i.e. the ejector tool, and the pneumatic ejection, i.e. the ejection unit comprising a nozzle for air compression, may also be used in combination.

The method and device according to the first and second aspects of the invention are particularly useful for forming holes in urinary catheters. However, they are also useful for many other types of medical devices. Accordingly, the method and device according to the present invention are not limited to urinary catheters. Examples of such other medical devices for which the present invention is useful are vascular catheters and other types of catheters, endo- and laryngo-scopes, tubes for feeding or drainage or endrotracheal use and devices for circulatory assistance.

In accordance with yet another aspect of the present invention there is provided a catheter having a tubular body comprising a drainage end and an insertion end, the catheter comprising:
  at least one pair of drainage openings located on a lateral wall of the tubular body at opposite sides of a cross-sectional plane comprising a longitudinal axis of said catheter;
  wherein each drainage opening has an edge with an extension both in a width direction and a length direction of said catheter, and wherein the edge is beveled towards an outer surface of the tubular body;
  wherein a degree of beveling, for each drainage opening, is higher for parts of the edge extending generally in the length direction than parts of the edge extending generally in the width direction.

With this aspect of the invention, similar advantages and preferred features are present as in the previously discussed aspects of the invention, and vice versa.

The degree of beveling is to be understood as how much a corner between two adjacent surfaces has been cut-off, the surfaces in the present context being an edge surface of a drainage hole and the outer surface of the lateral wall. In an alternative wording bevel can be interpreted as the angle that one surface makes with another when they are not at right angles, and the degree of beveling can be interpreted as how much the angle deviates from a right angle (90 degrees). Thus, the higher the degree of beveling the closer the two surfaces are to being parallel. Further, when it said that an edge of a hole is beveled it is to be interpreted as that the angle between the edge surface and the outer surface of the catheter is not 90 degrees (or 270 degrees depending on perspective).

The beveling is an advantageous and surprising result of the material deforming during the above-discussed a punching operation, and furthermore, due to the lateral wall of the catheter deforming to a higher extent in a lateral direction (in reference to the impact area or point) the degree of beveling is higher for the parts of the resulting hole edge of the opening that extends in the longitudinal direction. This terminology will however be further clarified in the detailed description in reference to the embodiments illustrated in the appended figures. It has been found by the present inventor that smooth, rounded or beveled edges are of particular importance in edges at the external surface and extending in the longitudinal direction of the catheter (i.e. parallel to the longitudinal axis of the catheter), but surprisingly of less importance in edges extending transversely to the longitudinal direction. A further advantage with this type of edge structure, viz. that the lateral edges (the edges generally extending in a longitudinal direction) are slightly smoother, is that it makes it easier and more comfortable to rotate the catheter during insertion. Rotation of the catheter is often required, in particular for male users, to pass through restrictions in the urethra, etc.

The catheter is preferably a urinary catheter made of a polymeric material. Moreover, the drainage openings are preferably circularly shaped but may however be of any suitable shape. As previously discussed, the use of circular drainage openings have proven to be advantageous in terms of obtaining smoother edges which increases comfort for the patients, and in some practical experimentations it has been shown that circular holes with a total hole area that is equal to or larger than the circular area of the catheter lumen will perform the same or greater flow rate than conventional oval catheter eyes with a total hole area that is significantly larger than the circular area of the catheter lumen.

The diameter of the circular drainage openings is preferably in the range between 0.75 mm and 2.0 mm, or more preferably between 1.0 mm and 1.5 mm, and most preferably between 1.1 mm and 1.4 mm.

These and other aspects of the invention will be apparent from and elucidated with reference to the embodiments described hereinafter.

BRIEF DESCRIPTION OF THE DRAWINGS

For exemplifying purposes, the invention will be described in closer detail in the following with reference to embodiments thereof illustrated in the attached drawings, wherein:

FIGS. 2a-d illustrate cross-sectional views in the radial direction of the catheter of a method for forming holes through a lateral wall of a catheter in accordance with an embodiment of the present invention.

FIG. 3 illustrates a cross-sectional view, in the radial direction of the catheter, of a method step in accordance with another embodiment of the present invention.

FIG. 5a illustrates a side-view of a catheter in accordance with an embodiment of the present invention.

FIG. 5b illustrates a magnified side-view of the insertion end 5 of the catheter illustrated in FIG. 5a.

FIG. 5c illustrates a cross-sectional view, in the longitudinal direction of the catheter, of the insertion end illustrated in FIG. 5b.

FIG. 5d illustrates a cross-sectional view, in the radial direction of the catheter, of the insertion end illustrated in FIG. 5b.

DETAILED DESCRIPTION

In the following detailed description, preferred embodiments of the present invention will be described. However, it is to be understood that features of the different embodiments are exchangeable between the embodiments and may be combined in different ways, unless anything else is specifically indicated. Even though in the following description, numerous specific details are set forth to provide a more thorough understanding of the present invention, it will be apparent to one skilled in the art that the present invention may be practiced without these specific details. In other instances, well known constructions or functions are not described in detail, so as not to obscure the present invention. In the detailed embodiments described in the following are related to urinary catheters. However, it is to be acknowledged by the skilled reader that the method and device are correspondingly useable on other types of medical devices insertable into a body passageway, such as other types of catheters, stents, etc.

Figure 1:
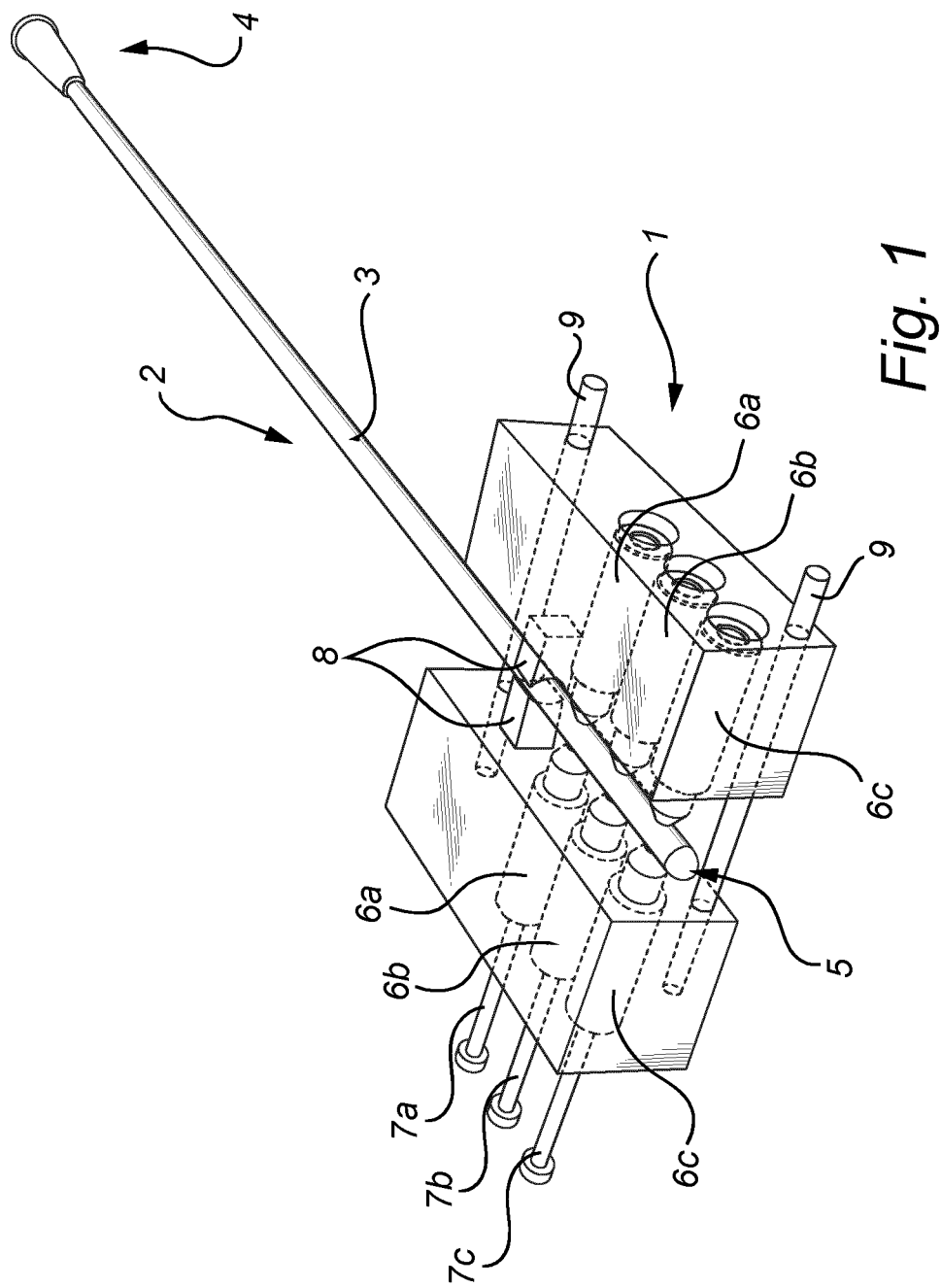
FIG. 1 illustrates a perspective view of a device for forming holes through a lateral wall of a catheter in accordance with an embodiment of the present invention.

FIG. 1 schematically shows a device 1 for forming holes (may be referred to as drainage openings or catheter eyes) through a lateral wall 3 of a catheter 2, here in the form of a urinary catheter. The catheter 2 has a tubular body with a drainage end 4 and an insertion end 5, and is preferably made of a polymeric material, such as e.g. silicone rubber, nitinol, nylon, polyurethane, thermoplastic elastomers, etc. (the list is non-exhaustive). The drainage end 4 and the insertion end 5 may also be referred to as the non-insertable end 4 and the insertable end 5, respectively.

The device 1 includes three pairs of tubular punching members 6a-c, each tubular punching member 6a-c having a cutting edge and an internal lumen. The device 1 may however have, depending on the intended application, only one, two or any other number of pairs of tubular punching members 6a-c (may simply be referred to as punching members in the following).

Each pair of punching members 6a-c is arranged in such a way that at least one of them is moveable towards the other punching member 6a-c (within the same pair), in order to punch through the lateral wall 3, at two opposing positions of the catheter 2, and thereby to sever two oppositely located hole pieces from the lateral wall 3 of the catheter 2. Oppositely located, in this context, is in reference to a cross-sectional plane of the catheter 2, the cross-section being taken in a longitudinal direction of the catheter 2, i.e. from the drainage end 4 to the insertion end 5. In some embodiments, the device 1 is configured, such that, both of the punching members 6a-c are movable towards each other within the same pair, simultaneously or sequentially. It goes without saying that the punching members 6a-c are also movable away from each other in each respective pair, i.e. retractable after a punching operation. In more detail, each pair of punching members 6a-c is arranged such that the two punching members 6a-c, within the same pair, can be moved so that the cutting edges of the two punching members penetrate the lateral wall 3 of the catheter 2 and are preferably almost brought in contact with each other within an internal lumen of the catheter 2 during a punching operation. However, in some practical implementations the cutting edges can also be brought completely in contact with each other during a punching operation.

In this particular embodiment each pair of punching members 6a-c is arranged such that at least a part of a central longitudinal axis of each punching member 6a-c within the same pair substantially coincides. Thus, the punching members 6a-c are arranged to be movable along the common central longitudinal axis.

Furthermore the device 1 comprises an ejection unit, or a set of ejection units, 7a-c, here in the form of ejector tools, one for each pair of punching members 6, for pushing or forcing the severed material (hole pieces) away from the catheter 2 via the internal lumen of the punching members 6a-c after a punching operation. This significantly reduces the risk of residual material being left within the lumen of the catheter 2 after the drainage openings have been formed. In many practical implementations the problem or risk of having residual material left inside the catheter is hereby completely mitigated. Each ejector tool 7a-c is movable, at least partly, along the internal lumen of both of the associated punching members 6a-c. A more detailed discussion regarding the operation of the punching members 6a-c and the corresponding ejector tool 7a-c of the device 1 will be provided in reference to FIG. 2a-d.

The device 1 further comprises a securing arrangement 8, here in the form of clamps, in order to secure/fix the catheter 2 during a punching operation. The skilled reader readily understand that the clamps are only schematically illustrated 8 and that there are several viable options of how to provide a securing arrangement to secure/fix the catheter during a punching operation. Moreover, the device 1 comprises an alignment structure 9 in order to ensure good alignment of the tubular punching members 6a-c, such that, a central axis of the opening at the cutting edge of each punching member 6a-c within the same pair substantially coincides when a punching operation is performed.

FIG. 2a illustrates a cross-sectional view of a step in a method for forming holes (drainage openings) through a lateral wall of a catheter. A section of a catheter 2 has been provided between of a pair of tubular punching members 6. The cross section is taken in the radial direction of the catheter 2 (or in the longitudinal direction of the punching members 6). The punching members 6 all have a cutting edge 10 and an internal lumen 11, and are preferably aligned such that their central longitudinal axes 101 substantially coincide. There is further an ejection unit, here in the form of an ejector tool 7, which is configured to be movable through the internal lumen 11 of the two punching members 6. The ejector tool 7 may have an elongated cylindrical body. In more detail, the ejector tool 7 is preferably arranged to enter the internal lumen of a first punching member of the two punching members 6, from a back end (i.e. the end opposite to the end having a cutting edge 10), and be movable through the internal lumen 11 of the first punching member 6. In this particular exemplary embodiment the ejector tool 7 is starting from a position within the internal lumen of one of the two punching members 6. However, the ejector tool 7 may also, initially, be totally retracted, thereby starting from a position outside the internal lumen of any one of the two tubular punching members 6. For example it may start with its front end portion being located behind one of the punching members 6. Moreover, a longitudinal central axis of the ejector tool 7 is preferably aligned with the central axis 101 of the punching members 6 during operation.

FIG. 2b illustrates a cross-sectional view of a subsequent position in comparison to FIG. 2a. The tubular punching members 6 have been driven (or moved) towards each other, as indicated by arrows 12, such that a deformation of the body of the catheter 2 has commenced. The punching members 6 are here also movable relative to the ejector tool 7, thus, the ejector tool 7 can remain in a static position until it is actuated in order to force/eject residual material out of the internal lumen 11 of the punching members.

Further, FIG. 2c illustrates a subsequent position of the punching members 6 in comparison to FIG. 2b. The punching members 6 have been further driven towards each other (as indicated by the arrows 12), such that, the cutting edges 10 of the punching members 6 have punched through/ penetrated the lateral wall 3 of the catheter 2. Thereby, a pair of oppositely located hole pieces 13 have been severed, or at least partly severed, from the lateral wall 3 of the catheter 2. The punching members 6 can be driven/moved towards each other so that their respective cutting edges 10 are brought in contact with each other within the internal lumen of the catheter 2, or at least far enough so that the distance between them is less than the thickness of the lateral wall 3 of the catheter 2. If the punching members 6 are repeatedly driven such that the cutting edges 10 are brought in contact with each other during each punching operation, the risk of residual material (remaining severed hole pieces) not escaping through the internal lumen 11 of the punching members 6 in the intended way, and possibly entering the internal lumen of the catheter 2, is even further minimized, but at the cost of increased wear of the cutting edges 10. Thus, the cutting edges 10 do not have to be brought in contact with each other as long as the cutting edges punch through at least a part, and preferably a significant part of the lateral wall 3 of the catheter 2 during a punching operation. The punching members 6 can e.g. be driven so to almost meet each other in the internal lumen of the catheter 2 only leaving a small distance, such as leaving a remaining thickness of e.g. 2-5 μm.

FIG. 2d illustrates the actuation of the ejector tool 7, in order to force severed hole pieces 13 away from the catheter 2 via the internal lumen 11 of the pair of tubular punching members 6. The ejector tool 7 is moved/driven (as indicated by the arrow 12) through a part of the internal lumen 11 of a first tubular punching member 6 (the one to the left in this particular figure) and into the internal lumen 11 of the other tubular punching member 6 (the one to the right in this particular figure). The severed hole pieces 13 can be pushed all the way through and out of the internal lumen 11 of the punching members 6 by the ejector tool, or they may be removed by other means, such as e.g. suction at the opposite end of the punching members 6 in reference to the ejector tool 7. Naturally, the ejector tool 7 and the tubular punching members may be withdrawn/retracted after the method step illustrated in FIG. 2d, so to start from a starting position again such as e.g. the one illustrated in FIG. 2a.

FIG. 3 illustrates the actuation of an ejection unit 7' according to another exemplary embodiment of the invention, more specifically, a nozzle 7' of an air compressing unit/air compressor (not shown). The nozzle 7' is preferably directed towards the internal lumen 11 of the punching members 6, and the air compressing unit is to be actuated after the punching members 6 have punched through the lateral wall 3 of the catheter 2. By blowing air into and through the internal lumen 11 (as indicated by arrow 16) the severed hole pieces (residual material) will be pneumatically forced away from the catheter 2 via the internal lumen of the punching members 6.

Figure 4:
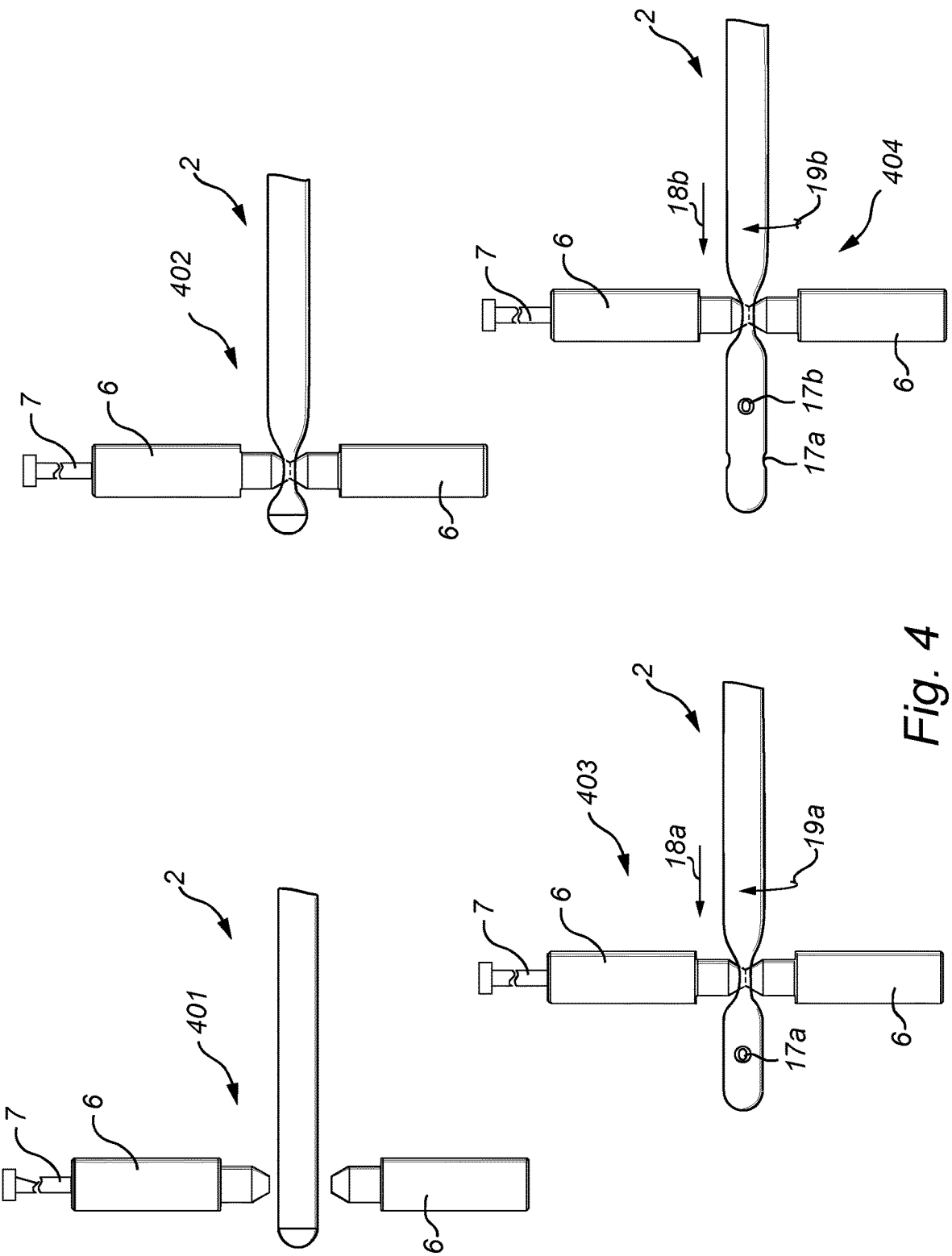
FIG. 4 illustrates method for forming holes through a lateral wall of a catheter from a side-view perspective in accordance with yet another embodiment of the present invention.

FIG. 4 illustrates a method 401-404 for forming holes 17a-b through a lateral wall of a catheter 2 in accordance with yet another embodiment of the invention. The illustration is from a straight side-view perspective and shown in four illustrative steps 401-404. Step 401 illustrates a first setup or starting position, where a section of a catheter 2 is provided between one pair of punching members 6. Next, the punching members 6 are driven towards each other, or at least one of them is driven towards the other, as indicated by the deformation in the section of the catheter 2 between the punching members 6. This allows the punching members 6 to punch through the lateral wall of the catheter 2. Even though not explicitly illustrated in FIG. 4, for the sake of brevity, the ejector tool is actuated/driven between each punching operation in accordance with the above-discussed concept, e.g. as described in reference to FIG. 2d. For the same reason, the withdrawing step(s) between each punching operation, i.e. the withdrawing of the punching members 6 and the ejector tool 7, is not shown.

Thus, after the first punching operation 402, the ejector tool 7 and the tubular punching members 6 are withdrawn, the catheter is moved 18a and rotated 19a, in order to be positioned for another punching operation. The catheter 2 is moved in a longitudinal (in reference to a longitudinal axis of the catheter 2) direction so to allow the pair of punching members 6 to remain in a static position, e.g. if mounted in a larger device or housing, while the catheter is moved in order to form another pair of oppositely located holes 17b that are spatially separated from the other pair of holes. In this particular illustration the catheter 2 is moved in a direction towards the insertion end of the catheter 2, however, the skilled reader readily understands that it may be moved in an opposite direction depending on how the punching operation(s) are performed, i.e. if the holes are intended to be punched downstream or upstream. Accordingly, the catheter 2 is moved, as indicated by arrow 18a, a suitable distance and rotated around a longitudinal axis, as indicated by arrow 19a, a suitable angular length, such as by 90 degrees, and the punching members 6 are subsequently driven in order to punch through the catheter 2 again, and thereby forming a total of two pairs of holes 17a-b which are spatially separated along the longitudinal axis of the catheter.

Step 404 illustrates a third punching operation, in an analogous manner as in step 403, i.e. after the second pair of holes have been formed the ejector tool 7 is actuated and withdrawn, the punching members 6 are withdrawn and the catheter is moved 18b and rotated 19b.

The punching may be repeated fewer or more times, in dependence on how many pairs of drainage openings that are needed. Further, punching of more than one pair of drainage openings at a time, as illustrated in FIG. 1, can also be used in combination with a repetition of the punching step, in accordance with FIG. 4.

FIG. 5a shows a side-perspective view of a catheter 2 in accordance with an aspect of the present invention. The catheter 2 has a tubular body, or in other words, a lateral wall/substrate 2 enclosing an internal lumen (not shown). Further, the catheter comprises a drainage end 4, which is flared as known in the art, and an elongated shaft or tube projecting forwardly from the drainage end 4. An open ended internal lumen (not shown) extends from the drainage end 4 of the catheter 2 to an insertion end 5 having a rounded tip and a set of drainage openings 17a-c. The drainage end 4 may function as a connector of the catheter 2, being connectable to other devices, such as a urine collection bag, a drainage tube or the like. The catheter has three pairs of drainage openings 17a-c, however, the skilled reader readily understands that depending on the intended application and particular needs the number of pairs of drainage openings 17a-c can be any suitable number. Each drainage opening 17a-c of each pair of drainage openings is located on the lateral wall 3 of the catheter at opposite sides of a cross-sectional plane taken in a longitudinal direction of the catheter 2. Further, the degree of beveling of the edge of each drainage opening 17a-c is varying at different parts of the edge, more specifically; the degree of beveling differs between parts of the edge extending in a longitudinal direction (length direction) of the catheter and parts extending in a lateral direction (width direction) of the catheter.

The degree of beveling can be understood as how much a corner between two adjacent surfaces has been cut-off, the surfaces in the present context being an edge surface 21, 22 of a drainage hole 17a-c and the outer surface 23 of the lateral wall 3. In an alternative wording bevel can be interpreted as the angle that one surface makes with another when they are not at right angles, and the degree of beveling can be interpreted as how much the angle deviates from a right angle (90 degrees). Thus, when it said that an edge of a hole is beveled it is to be interpreted to mean that the angle between an edge surface 21, 22 and an outer surface 23 is not 90 degrees (or 270 degrees depending on perspective). Further, beveled edges of a drainage hole also means that the distance between diametrically opposite sides of the drainage hole is larger at the external side of the catheter (at the surface facing the user), than the distance between corresponding diametrically opposite sides at the internal side (at the surface facing the internal lumen).

FIG. 5b shows a magnified side-view of an insertion end 5 of the catheter 2 in FIG. 5a. The insertion end 5 is provided with three pairs of drainage openings 17a-c. The three pairs of drainage openings 17a-c are positioned along a longitudinal axis of the catheter 2 and have a 90 degree alternating separation around the longitudinal axis of the catheter 2. However, in other embodiments all of the pairs of drainage openings could be linearly aligned along the lateral wall of the catheter, i.e. all of the drainage openings 17a-c having substantially parallel central axes. The middle (in reference to the figure orientation) drainage opening 17b indicates the different degrees of beveling of the edge. The degree of beveling is higher for the parts of the edge generally extending in the longitudinal direction than for parts of the edge generally extending in the lateral direction.

FIGS. 5c-d further elucidate the beveling of the drainage holes from different cross-sectional perspectives. FIG. 5c shows a cross-sectional view of the insertion end in FIG. 5b, where the cross-section is taken along a longitudinal axis of the catheter or insertion end, through two pairs of drainage openings 17a and 17c. Further, one can see the beveling of the drainage openings 17a-c from different perspectives, where the first hole pair 17a and third hole pair 17c are shown from a side perspective which illustrates a small degree of beveling of the hole edges that generally extend in a width direction (or lateral direction) of the catheter. In particular when compared to FIG. 5d, where the beveling of the parts of the hole edges that are extending in a longitudinal direction are illustrated. Moreover, these FIGS. 5c and 5d) further illustrate the concept of beveled edges and the term "degree of beveling", which is higher for the parts of the edges illustrated in FIG. 5d, i.e. the parts which generally extend in a longitudinal direction (or also called length direction). Accordingly, the degree of beveling can be understood as the variation of an angle between the outer surface 23 of the catheter body and the edge surface 21, 22 of the drainage openings, where a lesser degree of beveling indicates that the angle is closer to a right angle (90 degrees or 270 degrees depending on perspective).

Moreover, FIG. 5c shows the placement of the drainage openings 17a-c in reference to each other within the same pair. The first and third pair of drainage openings 17a, 17c have holes positioned on opposite sides of a cross-sectional plane 501 which comprises a longitudinal axis of the catheter. The middle pair 17b can be said to be placed on opposite sides of another cross sectional plane which is perpendicular to the first cross-sectional plane 501 but also comprises the longitudinal axis of the catheter. In preferred embodiments the two drainage openings 17a-c in each pair will be placed on opposite sides of a cross-sectional plane 501 and have central axes AA that substantially coincide. However, the holes may be punched slightly off-axis in reference to the axis AA in FIG. 5d, i.e. they can be punched to the right or to the left of the axis AA in FIG. 5d as long as they are punched from two (directly) opposite sides of the plane 501. In more detail, the holes are punched with coinciding central axes, however, when the lateral wall of the catheter returns/springs back from deformation the central axes of the two opposing drainage openings may be seen as non-coinciding, when arranged in such an off-axis position.

The catheter shaft and the catheter connector/rearward end may be of the same material, or of different materials. Further, the catheter shaft and the connector may be formed as an integrated, monolithic unit, or be formed as separated parts, connected to each other by welding, adhesion or the like. In case the connector is formed as a separate part, the punching of the drainage holes may occur before or after attachment of the connector to the catheter shaft.

At least the catheter shaft is preferably made of a polymer material, and the material may be a single material, or a mixture or blend of various materials. The material(s) may e.g. be thermoplastic elastomers and/or thermoplastic polymers. In particular, the material may be one or several polyolefin based elastomers, such as polyethylene, polypropylene, polyurethanes, latex rubbers, silicon rubbers, other rubbers, polyvinylchloride (PVC), other vinyl polymers, polyesters, polyacrylates, polyamides, styrene block copolymers (SEBS), or polyether block amide (PEBA), and combinations of these. The tubular shaft can also be made of a degradable material, e.g. of the type disclosed in WO 2011/036162, said document hereby being incorporated in its entirety by reference. The degradable material may e.g. comprise monosaccharide, disaccharide, oligosaccharide and/or polysaccharide.

Preferably, the material is suitable for extrusion or injection molding. The material of the tubular shaft preferably has a hardness adequate for the intended use. Specifically, the micro Shore A hardness should preferably be in the range 75-95, and more preferably in the range 75-90, and most preferably within the range 78-85, for the tubular shaft. It is preferred that the material is capable of being sterilized by known sterilization methods. In particular it is preferred that the material has a radiation resistance such that it can endure at least 25 kGy, and preferably at least 50 kGy, essentially without degradation, in order to enable radiation sterilization of the urinary catheter.

In case different properties are wanted, this may be accomplished with the use of the same material, e.g. by treatment of the materials in different ways, or by modification of the material(s) by using a different blend of polymers, by additives such as plasticizers, medical oil (i.e. oil of a medical grade), paraffin, etc.

The catheter is preferably provided with a hydrophilic surface layer exhibiting a low friction when wetted, and may e.g. be coated with a hydrophilic surface coating. The surface coating is preferably provided at least on an insertable part of the catheter. The surface coating may be provided on the shaft prior to or after the punching of the drainage holes. The coating process may be provided in the way discussed in EP 0 799 069 by the same applicant, said document hereby incorporated in its entirety by reference.

The hydrophilic polymer may be at least one of: polyvinyl compounds, polylactames, in particular such as polyvinyl pyrrolidones, polysaccharides, in particular heparin, dextran, xanthan gum, derivatised polysaccharides, hydroxy propyl cellulose, methyl cellulose, polyurethanes, polyacrylates, polyhydroxyacrylates, polymethacrylates, polyacrylamides, polyalkylene oxides, in particular polyethylene oxides, polyvinyl alcohols, polyamides, polyacrylic acid, copolymers of the previously mentioned polymers, copolymers of vinyl compounds and acrylates or anhydrides, copolymers of vinylpyrrolidone and hydroxy ethylmethyl acrylate, cationic copolymers of polyvinyl pyrrolidone and copolymer of polymethylvinyl ether and maleinic acid anyhydride, polyactide, polyethylene glycol and copolymers thereof. Preferably, the hydrophilic polymer is polyvinyl pyrrolidone.

The catheter is preferably arranged in a package, to maintain it sterile prior to use, and the package may also house a wetting liquid for wetting of the hydrophilic surface layer. The wetting liquid may either be maintained in direct contact with the catheter during storage, to maintain the catheter in a wetted ready-to-use state, or be maintained in a separate compartment, to be released into the compartment housing the catheter immediately prior to use.

Specific embodiments of the invention have now been described. However, several alternatives are possible, as would be apparent for someone skilled in the art. For example, other types of cross-sectional shapes of the punching members and drainage holes may be used, such as having oval shapes or somewhat rectangular shapes, different spatial arrangements of the punching members within the device in FIG. 1 are possible, various positioning and number of drainage openings are feasible, etc. Such and other obvious modifications must be considered to be within the scope of the present invention, as it is defined by the appended claims.

The invention claimed is:

1. A method for forming holes through a lateral wall of a catheter, said method comprising the steps of:
   providing a section of the catheter between a pair of tubular punching members each having an internal lumen and aligned so that their central longitudinal axes coincide;
   driving at least one tubular punching member of said pair of tubular punching members towards the other in order to punch through said lateral wall of the catheter and thereby to sever one pair of oppositely located hole pieces from the lateral wall;
   actuating an ejection unit, in order to force said severed hole pieces away from the catheter via one of said internal lumens of the tubular punching members;
   withdrawing, after said actuating of the ejection unit, said pair of tubular punching members.

2. The method according to claim 1, wherein the step of actuating the ejection unit comprises:
   driving an ejector tool at least partly through the internal lumen in a longitudinal direction of one tubular punching member and subsequently at least partly through the internal lumen of the other tubular punching member; and withdrawing said ejector tool.

3. The method according to claim 1, wherein the step of actuating the ejection unit comprises:

blowing compressed air through the internal lumen of said pair of tubular punching members.

4. The method according to claim 1, wherein the catheter is a urinary catheter.

5. The method of claim 1, wherein the step of driving the tubular punching members towards each other brings the tubular punching members to contact with each other within a lumen of the section of the catheter.

6. The method of claim 1, wherein the catheter is a urinary catheter and wherein the holes have a diameter between 1.0 and 1.5 mm.

7. The method of claim 1, wherein the catheter is a urinary catheter and wherein the holes have a diameter between 1.1 and 1.4 mm.

8. The method of claim 1, wherein the step of driving the tubular punching members towards each other brings the tubular punching members to a position where a distance between the tubular punching members is in the range of 2-5 micrometer.

9. A method for forming holes through a lateral wall of a catheter, said method comprising the steps of:

a) providing a section of the catheter between a pair of tubular punching members each having an internal lumen and aligned so that their central longitudinal axes coincide;

b) driving at least one tubular punching member of said pair of tubular punching members towards the other in order to punch through said lateral wall of the catheter and thereby to sever one pair of oppositely located hole pieces from the lateral wall;

c) actuating an ejection unit, in order to force said severed hole pieces away from the catheter via one of said internal lumens of the tubular punching members;

d) withdrawing, after said actuating of the ejection unit, said pair of tubular punching members;

e) adjusting a longitudinal and rotational position of the catheter between the pair of tubular punching members; and f) repeating steps a-d.

\* \* \* \* \*